No. 844,134. PATENTED FEB. 12, 1907.
W. J. JENKINS.
NIPPERS.
APPLICATION FILED NOV. 7, 1906.

WITNESSES:
Mabel L. Hawkins
L. E. Berkovitch

INVENTOR.
William J. Jenkins,
BY
Arthur B. Jenkins,
ATTORNEY.

UNITED STATES PATENT OFFICE.

WILLIAM J. JENKINS, OF ROCKFALL, CONNECTICUT.

NIPPERS.

No. 844,134.      Specification of Letters Patent.      Patented Feb. 12, 1907.

Application filed November 7, 1906. Serial No. 342,387.

*To all whom it may concern:*

Be it known that I, WILLIAM J. JENKINS, a citizen of the United States, and a resident of Rockfall, in the county of Middlesex and State of Connecticut, have invented a new and Improved Nipper, of which the following is a specification.

My invention relates to the class of devices used for cutting metal of small dimensions, such as wire and the like; and the object of my invention is to provide a device of this class having cutters each with a plural number of cutting edges and with means for protecting that edge which may not be in use; and a further object of the invention is to provide a device of this class in which the cutters may be firmly secured in place and properly supported to withstand the strain to which they may be subjected; and a further object of the invention is to provide a cutter of this class in which a sharp cutting edge may be maintained while preserving the support for the cutter.

A form of device in the use of which these objects may be attained is illustrated in the accompanying drawings, in which—

Figure 1:
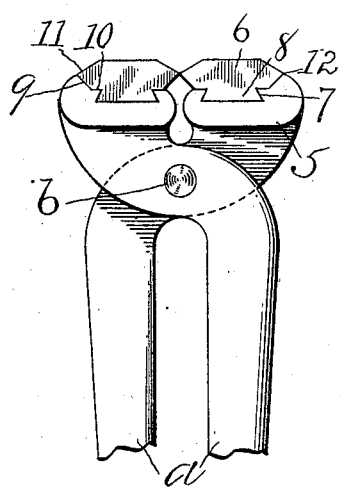
Figure 2:
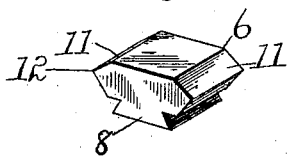
Figure 3:
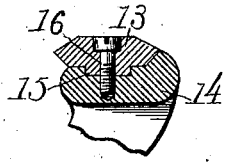

Figure 1 is a view in side elevation of the jaws and a portion of the handles of a pair of cutting-nippers embodying my invention. Fig. 2 is a perspective view of one of the cutters. Fig. 3 is a detail view in section through a portion of a jaw, showing another means of securing the cutter to the jaw.

In the accompanying drawings, the letter $a$ denotes the handles of a pair of nippers of usual form and construction and held in operative engagement by a pivot $b$ in a manner common to devices of this class. The end of each of the handles is provided with a head or jaw 5, having a seat for a cutter 6. This seat has a recess 7 for the reception of a stem 8, projecting from the back of the cutter. In the form shown the recess 7 extends across the jaw from side to side and is of dovetail shape, as shown in Fig. 1; but it is obvious that other constructions of recess may be employed with a correspondingly-shaped stem to fit therein.

A support 9 is formed on the head, this consisting of a beveled surface extending from the seat 10 outward and inclined at an angle to the seat, as plainly shown in Fig. 1. The inner face of each cutting edge of the cutter is beveled to fit the inclined support 9, the cutter as to its inner face and inner beveled portion of one cutting edge fitting snugly against the end of the jaw. The outer face of each edge of the cutter is beveled at 11 to form the cutting edge 12. It will be noted that the outer and inner beveled surfaces of each cutting edge extend transversely each to the other, providing the improved sharpening means hereinafter set out.

In the form of cutter as shown in Fig. 1 the dovetailed stem fitting within the groove in the head causes the cutter to be firmly held, and the support 9 properly sustains the cutter under the comparatively severe strains in use. The outer face of each cutting edge may be ground whenever it is desired to sharpen the cutter, and this without affecting the support between the cutter and head.

In the form of the device as shown in Fig. 3, the stem having straight sides, a screw 16 passes through the cutter 13 from the front face into the head 14. The stem 15 supports the cutter laterally, aided by the inclined support, as described with reference to Fig. 1, this arrangement of the stem and inclined support preventing any undue strain upon the holding-screw. It will be understood that each of the jaws is provided with a cutter of practically the same construction.

I contemplate as within my invention other means of securing the cutter in position, the broad feature of the invention residing in the jaw having a depressed portion for the reception of the cutter and an inclined seat and with each beveled cutting edge of the cutter adapted to rest on said inclined seat when such edge of the cutter is not in use.

What I claim as my invention, and desire to secure by Letters Patent, is—

1. A pair of handles operatively connected, heads borne on said handles and movable toward and from each other, each head having a depressed portion for the reception of a cutter and a beveled seat, a cutter having a plural number of beveled cutting edges, each cutting edge comprising an inner and outer beveled surface extending transversely one to the other, the inner beveled surface fitting said beveled seat, and means for holding the cutters in place.

2. A pair of handles operatively connected, heads borne on said handles and movable toward and from each other, each head having a depressed portion for the reception of a cutter and a beveled seat at the outer edge thereof, cutters each having a plural number of beveled cutting edges, each cutting edge comprising an inner and outer beveled surface extending transversely one to the other, the inner surface fitting said beveled seat, and means for holding the cutters in place.

3. A pair of handles operatively connected, heads borne on said handles and movable toward and from each other, each head having a depressed portion for the reception of a cutter and a beveled seat at the outer side thereof, cutters each having oppositely-disposed beveled cutting edges, said cutting edges each comprising an inner and outer beveled surface extending transversely one to the other, the inner beveled surface fitting said beveled seat, and means for holding the cutters in place.

4. A pair of handles operatively connected, heads borne by said handles and movable toward and from each other, each head having a depressed portion with a beveled seat at the outer side thereof for the reception of a cutter and a recess for the reception of the stem of a cutter, and cutters each having oppositely-disposed beveled cutting edges, each cutting edge comprising inner and outer beveled surfaces extending transversely each to the other, the inner beveled surface fitting said beveled seat, and means for holding the cutter in place.

5. A pair of handles operatively connected, heads borne by said handles and movable toward and from each other, each head having a depressed portion with a beveled seat at the outer side thereof for the reception of a cutter and a groove extending crosswise of the head for the reception of the stem of the cutter, and cutters each having oppositely-disposed beveled cutting edges, each cutting edge including inner and outer beveled surfaces extending transversely each to the other, the inner surface fitting said beveled seat, and means for holding the stems of said cutters in place in said groove.

WILLIAM J. JENKINS.

Witnesses:
ARTHUR B. JENKINS,
NELSON H. PARKER.